Patented Aug. 29, 1939

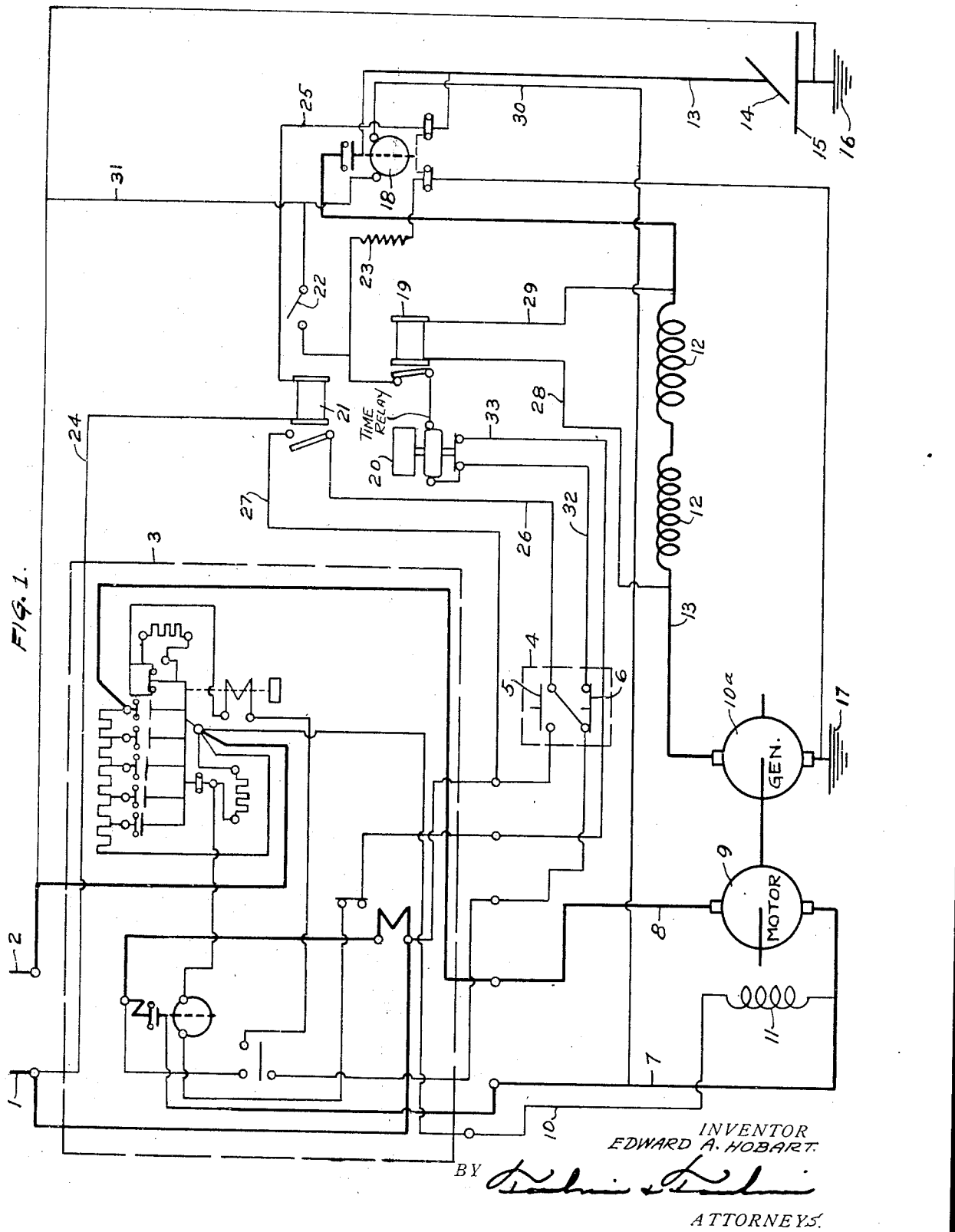

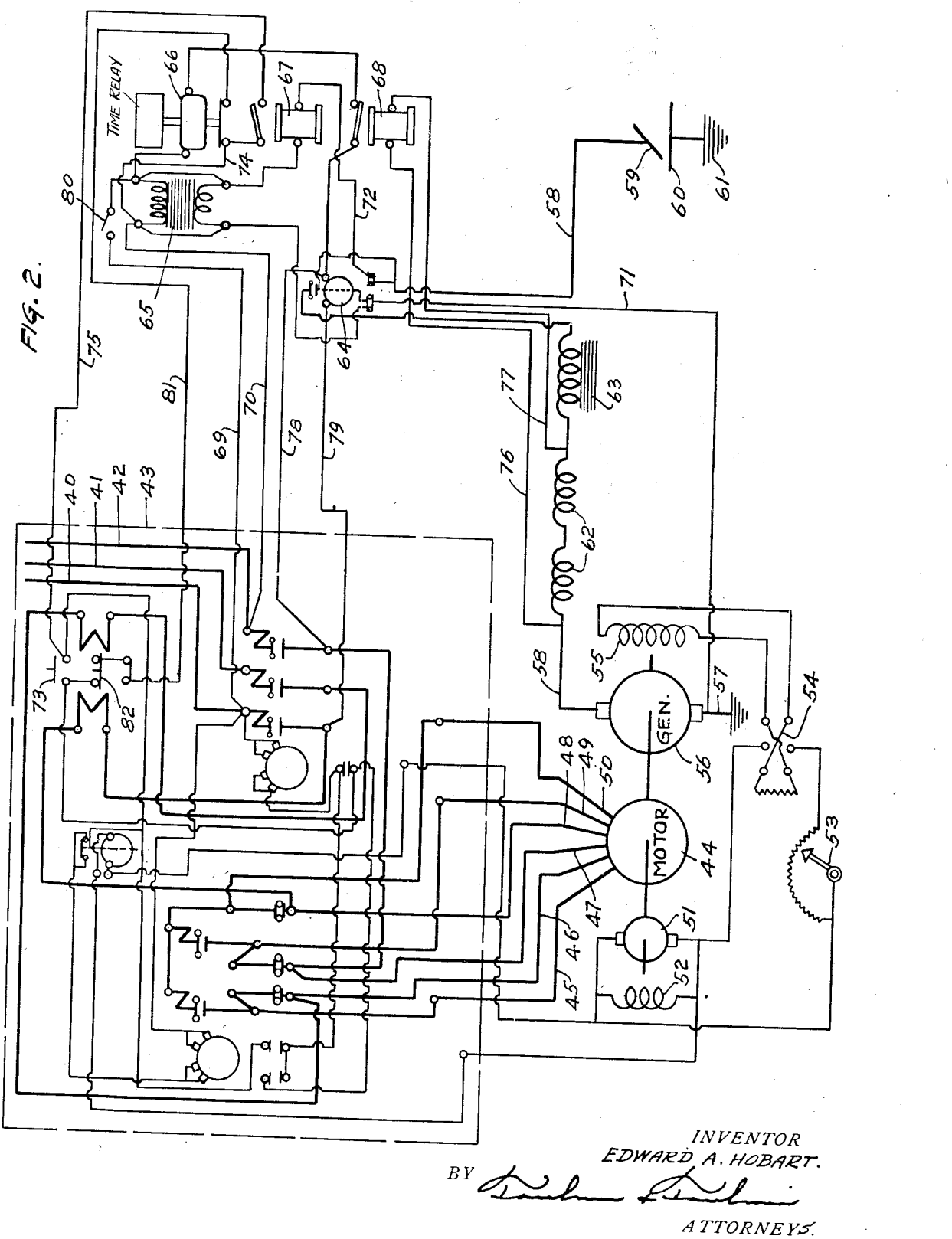

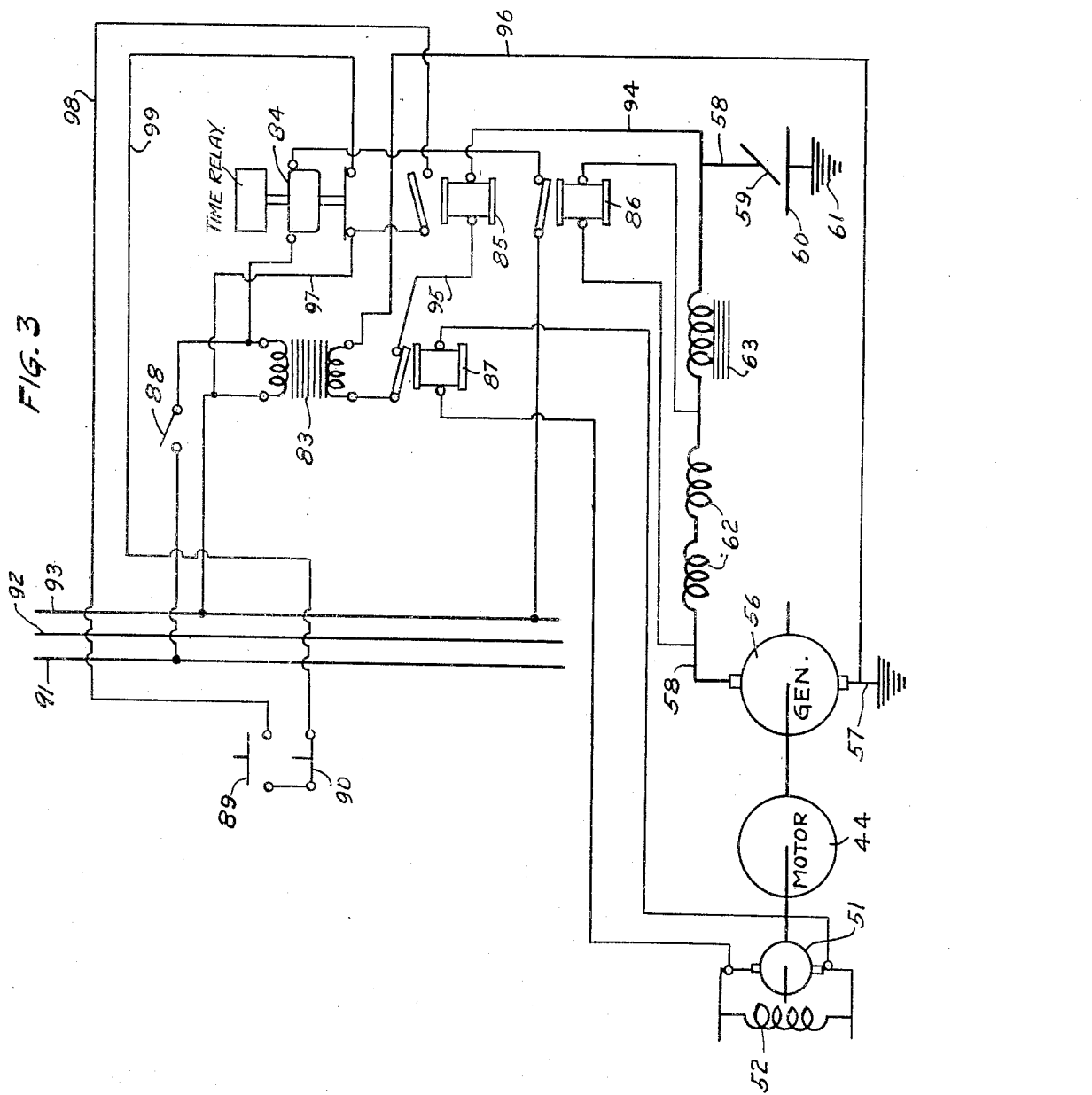

2,170,861

UNITED STATES PATENT OFFICE 2,170,861

ELECTRIC APPARATUS POWER SAVER

Edward A. Hobart, Troy, Ohio

Application August 10, 1934, Serial No. 739,303

4 Claims. (Cl. 171—123)

This invention relates to welding apparatus and in particular to devices for automatically starting and stopping the apparatus upon the suspension or resumption of welding activities.

One object of my invention is to provide a circuit and apparatus for automatically starting welding apparatus merely by the operation of touching the electrode to the work piece.

Another object is to provide electrical devices arranged in an electrical circuit whereby the operator can start his machine while at a distance from it, merely by bringing the welding electrode into contact with the work piece, and without the provision of any cables or conductors other than those regularly used in welding work.

Another object is to provide electrically-actuated devices arranged in an electrical circuit whereby the welding apparatus will be automatically stopped when the operator removes the electrode from the work piece.

Another object is to provide electrically-actuated devices in an electrical circuit so arranged that the welding apparatus will be caused to cease operation automatically a predetermined time after the operator removes the welding electrode from the work piece, thereby allowing the welding electrode to be removed from the work piece for short periods of time without stopping the apparatus, such as for changing electrodes or making slight adjustments.

In the drawings:

Figure 1 is a diagrammatic view of an electrical circuit containing electrical devices adapted to automatically stop and start welding apparatus arranged according to my invention, and adapted to be operated from direct current mains;

Figure 2 is a diagrammatic view of an electrical circuit and apparatus for automatically starting and stopping welding apparatus, and adapted to be supplied with power current from three-phase alternating current mains;

Figure 3 is a diagrammatic view of a modified electrical circuit and electrical devices adapted to automatically start and stop welding apparatus, these devices being likewise actuated from three-phase alternating current power lines.

One of the chief problems faced by the applicant in making this invention was to provide welding apparatus which could be started and stopped automatically without requiring the operator to leave his welding position or station. In the prior art operations of welding, it has been found that the average arc-welding machine is used to actually weld but approximately 50% of the time it is in operation. The balance of the time is consumed in setting up the work, changing electrodes, rest periods or even idling on the part of the operator. The latter is also frequently called away from his work for short periods in order to attend to other duties and he usually allows his machine to run idle rather than to take the trouble of stopping and starting it each time he leaves. This unnecessary operation of the welding machine, from whatever cause, results in a consumption of current as well as in a considerable amount of wear and tear which increases the cost of operations to an unnecessary extent.

By the applicant's invention, the welding machine is automatically stopped a predetermined time after the operator ceases welding: this time lag stops the machine only after a period of time longer than that which would be consumed in changing electrodes or making minor adjustments of the work. The applicant's invention also provides a quick starting of the welding machine from a distance, and without the provision of additional cables or controls extending out to the operator's position. A further result of the applicant's invention is that the automatic shutting down of the machine immediately calls the foreman's attention to the fact that the operator is not doing actual welding work. The opportunities for idleness on the part of the operator are accordingly reduced and the fact of idleness made immediately apparent.

The power-saving device of my invention, in general, comprises devices for automatically starting the apparatus by merely making contact of the welding electrode to the ground and without additional leads other than the regular welding leads; and also an automatic time limit stopping device which shuts down the machine a predetermined period of time after the welding arc is broken, one minute being a convenient time.

*Circuit for direct current operation*

Referring to the drawings in detail, Figure 1 shows a circuit containing electric devices arranged to be actuated from direct current mains 1 and 2. These direct current mains supply current to a starting box, generally designated 3, and contained within the dashed lines in the upper lefthand corner of Figure 1. This motor starter is of a commercial type known to those skilled in the art and requires no detailed description. It is controlled by a push button assembly, generally designated 4, and consisting of a push button starting switch 5 together with a push button stopping switch 6. From the motor starting box 3, the leads 7 and 8 convey current to the direct current motor 9, whereas the line 10 conducts current through the field windings 11 thereof. The motor 9 is drivingly coupled to the generator 10a, the latter being provided with the interpole diverters 12 located in the conductor 13 connecting the welding electrode 14 to the generator 10a. The work piece 15 is connected to the ground, as at 16, whereas the generator is grounded, as at 17.

The devices for automatically starting and stopping the welding motor 9 comprise a main contactor switch 18, having its chief contactor normally opening the circuit in the welding conductor 13. Also provided are the normally-closed stopping relay 19, the normally-closed time relay 20, the normally-open starting relay 21, the throw-out switch 22 and the resistor 23.

In the operation of the circuit and devices shown in Figure 1, it will be assumed that the welding apparatus is in operation. It will also be assumed that the manual throw-out switch 22 is closed in order to enable the automatic devices to become energized. The starting and stopping push button switches 5 and 6 controlling the operation of the motor starting box 3, will be assumed to be in the positions shown in Figure 1.

To automatically start the welding apparatus, the operator merely touches the electrode 14 to the work piece 15. When this occurs, the operating coil of the starting relay 21 is energized by current coming from the power line 1 along the lines 24 and 25 to the welding line 13 and thence to the ground. The closing of the normally-open switch of the starting relay 21 permits current to pass around the starting switch 5 by way of the lines 26 and 27, bridging the starting switch 5. The bridging of the starting switch 5 causes the motor starter 3 to become operative, causing the motor 9 to start driving the generator 10. Some of the welding current passing along the welding line 13 is diverted by way of the lines 28 and 29 to the operating coil of the stopping relay 19, energizing it and opening its normally-closed switch. This action breaks the circuit which would otherwise energize the operating coil of the time relay 20, keeping the latter temporarily out of operation.

At the same time, the energization of the motor 9 also results in part of the current thereto being diverted to energize the operating coil of the main contactor switch 18 by way of the lines 30 and 31, running from the motor line 7 and the power line 2 respectively. The main switch thereof now closes, allowing the welding current to pass from the generator along the welding line 13 to the welding electrode 14 and the work piece 15 to the ground at 16.

To stop the apparatus the operator merely removes the electrode 14 from contact with the work piece 15 or other connection with the ground. In order to make the apparatus stop, however, this contact must be broken for a period longer than that set for the time relay 20, otherwise the apparatus continues to operate.

When the operator breaks the circuit in the welding line 13 by removing the electrode 14 from the work piece 15, this action de-energizes the operating coil of the normally-closed stopping relay 19, whose switch has hitherto been held open by its energization. The closing of the latter switch permits the time relay 20 to start operating. After the lapse of a set period of time, the switch of the time relay 20 opens and breaks the circuit in the lines 32 and 33 running to the stop switch 6. This action breaks the circuit therein and operates the motor starter 3 in such a manner as to shut off the current from the power lines 1 and 2 to the motor lines 7 and 8, stopping the motor. The stopping of the motor also de-energizes the operating coil of the main contactor switch 18, opening its main switch and accordingly opening the circuit in the welding line 13.

Circuit for alternating current operation

The circuit shown in Figure 2 is adapted to be operated by alternating current received from the power lines 40, 41 and 42, proceeding immediately into the motor starting box 43. The motor starting box 43 is of conventional design and is of a type known to those skilled in the electrical art. The boundaries of the circuit contained in the starting box are indicated by the dashed lines, and the leads therefrom to the motor 44 are indicated by the numerals 45, 46, 47, 48, 49 and 50 respectively. The motor drives an exciter 51 which is connected to a field coil 52, and a field rheostat 53. A reversing switch 54 is provided to reverse the connections leading to the generator shunt field 55.

The motor 44 is drivingly connected to the welding generator 56, the latter having one terminal grounded by the ground line 57. The opposite terminal carries welding current by the line 58 to the welding electrode 59, the work piece 60 and the ground 61. The welding line 58 is provided with interpole diverters 62 and the reactance choke 63.

The circuit shown in Figure 2 is additionally provided with the main line contactor switch 64, the transformer 65 for supplying control current at low voltages, the time relay switch 66, the starting relay 67 and the stopping relay 68. The primary of the transformer 65 is energized by current in the lines 69 and 70 running from the starting box 43, and supplied by the power lines 40 and 42 respectively. The secondary winding of the transformer 65 supplies low voltage current.

In the operation of the alternating current circuit shown in Figure 2, to start the apparatus, the operator touches the electrode 59 to the work piece 60 or other ground connection. When this occurs, the operating coil of the normally-open starting relay 67 is energized by current passing through a circuit containing it, the secondary winding of the transformer 65, and the lines 71 and 72 leading respectively to the ground connection 57 of the generator 56 and to the welding line 58, having the ground connection 61. The closing of the switch of the starting relay 67 then closes the circuit around the starting switch 73 in the starting box 43 by way of the lines 74 and 75. The switch 80 is assumed to be closed.

The motor starter 43 then becomes operative to energize the motor 44 with current along the lines 45 to 50 inclusive; and the exciter 51 likewise starts running. Current then is generated in the welding generator 56 and flows through the welding line 58 to the welding electrode 59 by way of the interpole diverters 62 and the reactance choke 63. A part of this current is diverted by way of the lines 76 and 77 to energize the operating coil of the normally-closed stopping relay 68, opening its switch and preventing the energization of the time relay switch 66.

Furthermore, the operating coil of the main line contactor switch 64 becomes energized through the lines 78 and 79, running from the motor starting box 43 when the latter becomes operative, closing the main switch and permitting the welding current to flow therethrough.

To stop the motor and the welding apparatus, the operator merely removes his electrode 59 from the work piece 60 for a greater length of time than the set period of the time relay switch 66. When this occurs, the starting and stopping relays 67 and 68 become de-energized. The switch of the stopping relay 68 then returns to its normally-closed position, allowing current to flow through the operating coil of the time limit relay switch 66. After this current flows for a predetermined length of time, according to the setting of the time relay switch 66, the latter becomes operative and opens the circuit between the lines 74 and 81 running from the point of energization at the transformer 65 to the stop switch button 82 in the motor starter box 43. The latter then becomes inoperative and cuts off the current, proceeding to the motor, and stopping the motor 44. By the same train of occurrences, the operating coil of the main line contactor switch 64 becomes de-energized, causing the main switch thereof to open the circuit in the welding line 58. In this manner the welding apparatus ceases operation a short period of time after the operator stops welding.

Modified alternating current circuit

The alternating current circuit shown in Figure 3 is generally similar to that shown in Figure 2, but dispenses with the main line contactor switch 64. The remaining parts of the circuit are similar to those of Figure 2. They comprise the transformer 83, the time relay switch 84, the normally-open starting relay 85, the normally-closed stopping relay 86, the normally-closed exciter relay 87 and the throw-out switch 88. The motor, generator, exciter, and the intermediate devices between the generator and the electrode are similar to those described in Figure 2, and are similarly numbered. The starting push button switch 89 and the stopping push button switch 90 control the motor starting box (which is not shown) and which may be similar to that shown in Figure 2. Alternating current is received along the three-phase power lines 91, 92 and 93.

To start the apparatus shown in Figure 3, the operator touches the electrode 59 to the work piece 60 as before. The starting relay 85 then becomes energized by current flowing from the welding line 58 along the lines 94 and 95, the switch bar of the exciter relay 87, the secondary winding of the transformer 83 and the line 96 running to the ground line 57 of the generator 56.

The normally-open switch of the starting relay 85 then closes, permitting current to pass along the lines 97 and 98 to bridge the starting push button switch 89 and starting the motor in a manner similar to that already described for Figure 2. The flow of welding current which ensues causes the energization of the normally-closed stopping relay 86, opening its switch and preventing the energization of the time relay 84.

As the motor gathers speed and the exciter delivers its maximum current, the normally-closed exciter relay 87 becomes energized and opens its switch. This action breaks the circuit leading to the secondary winding of the transformer 83, protecting it from being burned out by the direct current flowing back to it from the welding line 58.

The transformer current from the secondary winding of the transformer 83 may choose two paths by which it may proceed: one path is through the electrode 59 to the ground at 61, whereas the other path is through the armature itself. The line 94, however, is joined to the welding line 58 at a point beyond the reactance choke 63, hence the latter permits very little current to flow in that direction—not enough current, in fact, to operate the starting relay 85. This arrangement employing the reactance choke 63, however, would not operate in this manner for a direct current circuit, since the choking effect would then be absent.

To automatically stop the apparatus shown in Figure 3, the operator removes the electrode 59 from the work piece 60, as before. This breaks the circuit in the starting relay 85 and thus interrupts the flow of current around the starting push button switch 89. The same action breaks the circuit in the normally-closed stopping relay 86, closing the circuit and energizing the time relay 84. The latter starts operating, and after its operating period its normally-closed switch is opened, thereby breaking the circuit in the lines 97 and 99 leading to the stop push button switch 90. The motor starting box then becomes inoperative in the manner previously described and the motor 44 stops, thus causing the flow of welding current along the welding line 58 to cease. The consequent stopping of the exciter 51 deenergizes and closes the normally-closed exciter relay 87, restoring the connection of the secondary of the transformer 83 to the welding line 58, thereby placing the starting relay 85 in readiness for energization when the welding electrode 59 is next caused to touch the workpiece 60 upon the resumption of welding.

It will be understood that I desire to comprehend within my invention such modifications as may be necessary to adapt it to varying conditions and uses.

Having thus fully described my invention, what I claim as new and desire to secure by Letters Patent is:

1. In an electrical control system, a generator having a field circuit and an output circuit, a motor for driving said generator, a supply circuit for supplying electrical energy to said motor, a control circuit including means responsive to the closing of said generator output circuit for energizing said motor supply circuit to start said motor and operate said generator, an exciter for said generator field circuit, means for supplying control current to said control circuit, and means responsive to the operation of said exciter for opening said control current supply circuit whereby to prevent the flow of generator output circuit current therethrough.

2. In an electrical control system, a generator having a field circuit and an output circuit, a motor for driving said generator, a supply circuit for supplying electrical energy to said motor, a control circuit including means responsive to the closing of said generator output circuit for energizing said motor supply circuit to start said motor and operate said generator, an exciter for said generator field circuit, means for supplying control current to said control circuit, means responsive to the operation of said exciter for opening said control current supply circuit whereby to prevent the flow of generator output circuit current therethrough, a time-responsive device adapted a predetermined time after its energization to open said motor supply circuit, and means responsive to the operation of said generator for deenergizing said time-responsive device and responsive to the cessation of operation of said generator for energizing said time-responsive device.

3. In an electrical control system, a generator having a field circuit and an output circuit, a motor for driving said generator, a supply circuit for supplying electrical energy to said motor, a control circuit including means responsive to the closing of said generator output circuit for energizing said motor supply circuit to start said motor and operate said generator, an exciter for said generator field circuit, means for supplying control current to said control circuit, means responsive to the operation of said exciter for opening said control current supply circuit whereby to prevent the flow of generator output circuit current therethrough, and means for preventing the flow of control current backward to said generator.

4. In an electrical control system, a generator having a field circuit and an output circuit, a motor for driving said generator, a supply circuit for supplying electrical energy to said motor, a control circuit including means responsive to the closing of said generator output circuit for energizing said motor supply circuit to start said motor and operate said generator, an exciter for said generator field circuit, means for supplying control current to said control circuit, means responsive to the operation of said exciter for opening said control current supply circuit whereby to prevent the flow of generator output circuit current therethrough, a time-responsive device adapted a predetermined time after its energization to open said motor supply circuit, means responsive to the operation of said generator for deenergizing said time-responsive device and responsive to the cessation of operation of said generator for energizing said time-responsive device, and means for preventing the flow of control current backward to said generator.

EDWARD A. HOBART.